INVENTORS
DAVID L. ARENBERG
ROBERT M. ASHBY

BY W.R. Maltby
D.C. Snyder

ATTORNEYS

March 11, 1958 D. L. ARENBERG ET AL 2,826,744

MULTIPLE MODE PRISM DELAY LINE

Filed May 20, 1953 5 Sheets-Sheet 2

INVENTORS
DAVID L. ARENBERG
ROBERT M. ASHBY

BY W.R. Maltby
D.C. Snyder

ATTORNEYS

INVENTORS
DAVID L. ARENBERG
ROBERT M. ASHBY
BY W. R. Maltby
D. C. Snyder
ATTORNEYS

MULTIPLE MODE PRISM DELAY LINE

INVENTORS
DAVID L. ARENBERG
ROBERT M. ASHBY
BY W.R. Maltby
D.C. Snyder
ATTORNEYS March 11, 1958 D. L. ARENBERG ET AL 2,826,744

MULTIPLE MODE PRISM DELAY LINE

Filed May 20, 1953 5 Sheets-Sheet 5

INVENTORS
DAVID L. ARENBERG
ROBERT M. ASHBY
BY W. R. Maltby
D. C. Snyder
ATTORNEYS

United States Patent Office 2,826,744

Patented Mar. 11, 1958

2,826,744

MULTIPLE MODE PRISM DELAY LINE

David L. Arenberg, Rochester, Mass., and Robert M. Ashby, Pasadena, Calif.

Application May 20, 1953, Serial No. 356,326

9 Claims. (Cl. 333—30)

(Granted under Title 35, U. S. Code (1952), sec. 266)

This invention relates generally to the art of delaying the transmission of electrical signals, and pertains more particularly to ultrasonic delay lines employing multiple reflections of a directed acoustical beam.

It is frequently desirable in devices such as cancellation circuits for moving target indicators, computer memory devices, oscillator controls, and timing devices to delay the transmission of electrical signals for periods of time ranging up to several milliseconds in duration without amplitude or phase distortion. For delays of such magnitude it is usually not feasible to employ electromagnetic delay lines if broad signal bandwidth is required, as the transmission path would be of inordinate length. Various types of ultrasonic delay lines have been developed for the purpose of attaining a longer delay time than is possible with broad band electromagnetic delay lines of practical length. These ultrasonic delay lines operate as follows:

The signals to be delayed for small and finite time intervals are caused to modulate a high-frequency signal, which can be of the order of several megacycles per second. This modulated high-frequency signal is converted to an acoustical signal by a piezoelectric transducer, and the acoustical signal is made to traverse a predetermined path as ultrasonic energy. At the end of this path, some or all of the acoustical energy is reconverted to electrical energy by a second piezoelectric or photoelectric transducer, amplified, and then detected to yield the original signals. The relatively low velocity of propagation of sound within the delay line results in longer delay times than is possible with practical electromagnetic delay lines of comparable bandwidth, the delay time in such an ultrasonic delay line being proportional to the total path length between the input and the output of the device.

Even with the relatively low velocity of propagation of sound, it frequently happens that the path length required is so great that it is difficult or impractical to construct an ultrasonic delay line having a single straight path from the input to the output of the device. To further reduce the over-all length of ultrasonic delay lines, where longer delay times must be provided, tubes containing a liquid propagation medium have been arranged in various patterns with reflectors placed at the junctions of the tubes to direct the energy from one tube to another. Delay lines of this type also have a large size, are relatively difficult to construct, and are subject to leakage of the propagation medium.

A second type of delay line using folded or multiple reflection paths consists of a tank containing a liquid propagation medium with reflectors placed at certain points in the tank in the path of the ultrasonic beam. These reflectors cause the ultrasonic beam to traverse the length and width of the tank a number of times before arriving at the output of the delay line. Delay lines of this type are also difficult to construct, are frequently unstable in their operation, and are likely to produce unwanted signals.

A third type of delay line using multiple reflection paths consists of either rectangular solids or rectangular forms containing liquid propagation mediums wherein a beam of energy is introduced at one corner of the rectangle and is directed at a point on the rectangle wall close to the corner opposite the point of introduction. Reflection of the beam takes place and a path is traced across the last-mentioned corner to another wall of the rectangle. A second reflection takes place at this point and the beam is reflected back to a point on a wall of the rectangle close to the corner where the beam originated. Successive reflections continue until the path traced by the beam comprises two series of parallel lines diagonally disposed across the rectangle, with one series of lines being perpendicular to the other series, the path terminating at a corner adjacent to the corner of origin in a suitable receiver. Delay lines of this type are said to have rectangular symmetry. The primary disadvantage of a rectangularly symmetrical design is that reflection must take place several times from any given wall of the structure to provide sufficient path length. For efficient use of the delaying medium, successive points of reflection on each wall must necessarily be closely spaced. Since the energy is not usually capable of being confined to a beam of small diameter, the desired path is not followed by all the energy. Thus, portions of the energy follow paths of greater and shorter length than the desired path. The ultimate result is that the major signal reaching the receiver is accompanied by several unwanted signals caused by the energy that has traced paths other than the desired primary path.

To minimize these objections and difficulties, an ultrasonic delay line comprising a right prism of many sides roughly approximating a circular disc in appearance and constructed of a suitable solid ultrasonic propagation medium heretofore has been employed. The delay line is constructed by grinding a number of facets on the periphery of a circular disc, the top and bottom surfaces being left flat. The number of facets is greater than 4 and preferably, the number is uneven or a multiple of 4. Except for the first and last facets, on which generating and receiving transducers are mounted, all of the facets are normal to the top and bottom disc surfaces and to radii of the original disc respectively passing centrally therethrough. The first and last facets are maintained normal to the top and bottom surfaces of the disc but are tilted slightly from the normal to the radii of the disc passing centrally through the facets. Thus, when energy is introduced by the transmitting crystal transducer, it is directed across the disc to a reflecting facet and is subsequently reflected several times from other facets across the disc until it impinges on the receiving crystal transducer. Such a delay line is shown and described in the copending application of David L. Arenberg and Robert Ashby entitled, "Ultrasonic Delay Line," Serial No. 255,128, filed November 6, 1951, now Patent No. 2,777,997.

Although such a many sided prism is more compact and has less secondary signals because of larger angles between nongeometrically directed rays than the rectangular or square reflecting types of delay lines, secondary signals are still present to some degree, and such secondary signals cause interference that becomes of importance when these signals arrive in phase at the receiver crystal and add vectorially. Such addition occurs because radiation from any facet, including the facet on which the transmitter crystal is mounted, can reach any other facet due to diffraction effects that are present, causing the energy to propagate in undesired geometrical patterns in addition to the desired one. Thus the possible paths of equal length are numerous and result in equally spaced secondary signals that are troublesome, particularly when they add to a level comparable to that of the primary desired signal.

To reduce the level of secondary signals, a further improvement in this type of delay line has also been employed. In such a device, successive legs of the energy path are adjusted in length in such a manner as to tend to effect a cancellation of secondary signals. This is accomplished, in one embodiment, by making the delay line slightly elliptical in general outline, the facets being tangent to such an ellipse, so that successive legs of the primary reflection path of the signal increase progressively by fractions of a wave length of said signal and then decrease progressively by fractions of a wave length of said signal. Such a device is shown and described in the copending application of David L. Arenberg, entitled "Ultrasonic Delay Line," Serial No. 162,573, filed May 17, 1950. The above principle is incorporated in the present invention to some extent by having the delay line elongated to a much greater degree for other reasons as will be shown hereinafter in discussing apertures.

The present invention presents a further development in the art of delay lines, wherein the desiderata of providing delay times of suitable duration in a device that is more compact for the same delay time and that can be manufactured with economy, assuring good pulse shape with little amplitude or phase distortion, suppressing secondary signals more effectively, and decreasing the input to output signal ratio so that power requirements are lower, are all accomplished by the use of multiple modes of propagation and energy absorbing areas with greatly improved quality of performance thereby achieved.

Other objects and many of the attendant advantages of this invention will be readily appreciated as the same becomes better understood by reference to the following detailed description when considered in connection with the accompanying drawings in which.

Figure 8:
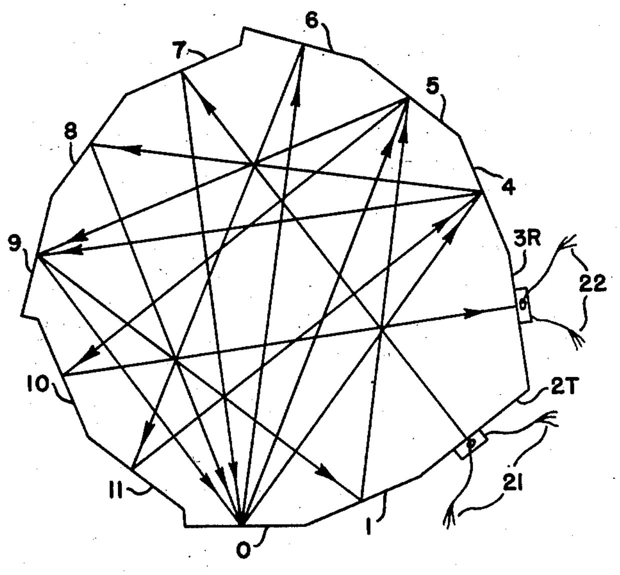
Figure 9:
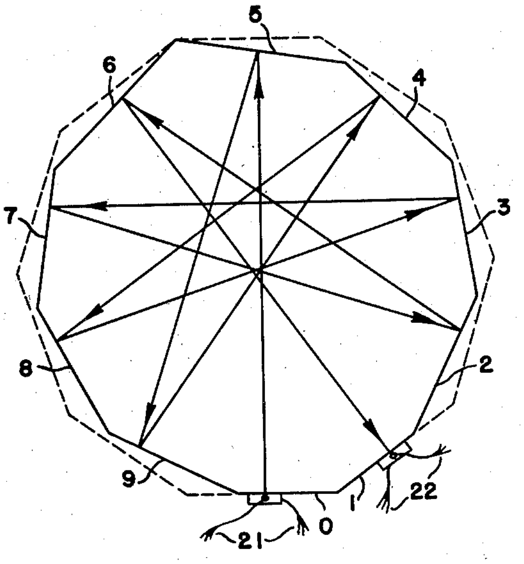
Figure 7A:
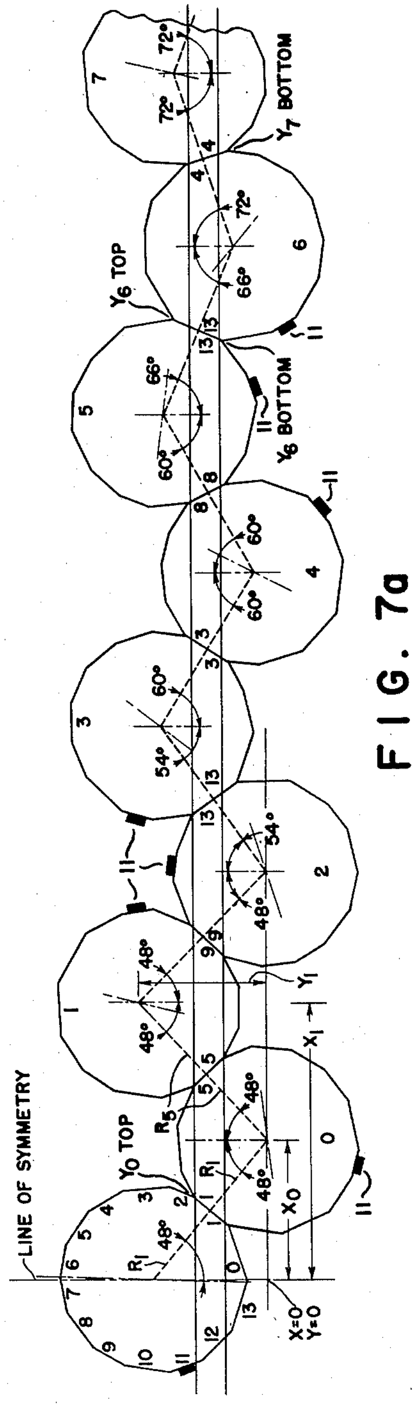
Figure 7B:
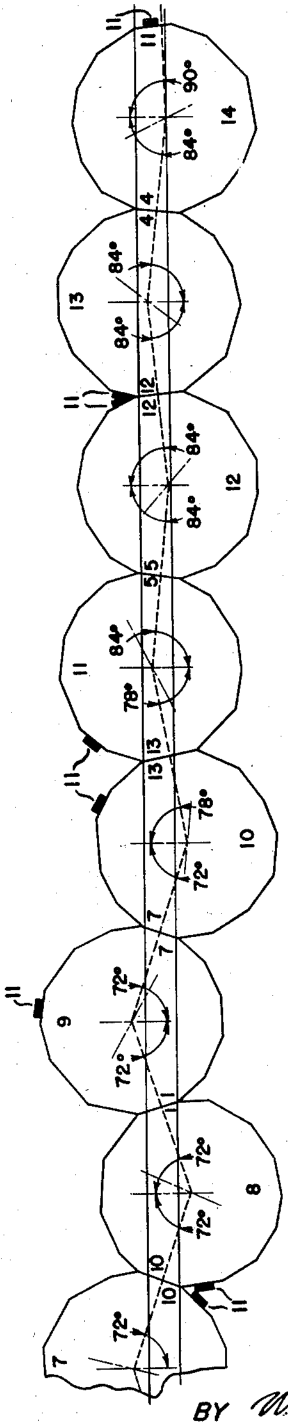
Figure 10:
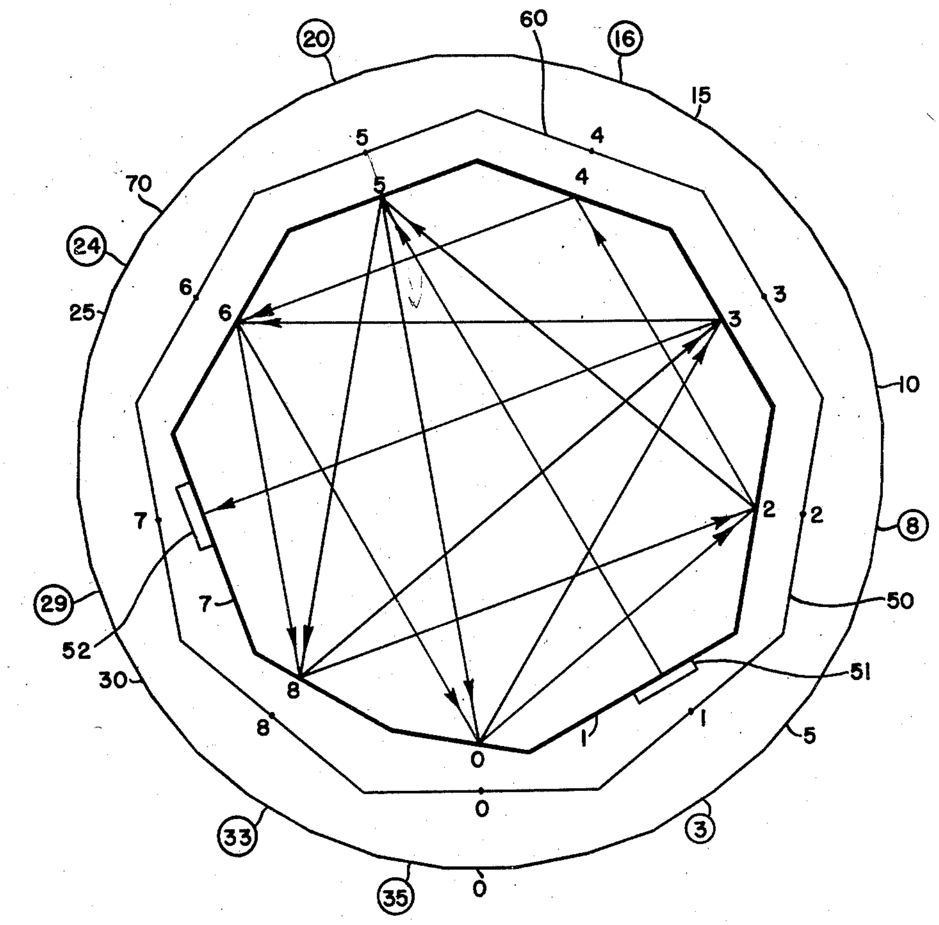

Figs. 7*a* and 7*b* illustrate one-half of the unfolded pattern of a fifteen facet multiple mode ultrasonic delay line, Fig. 7*b* being a continuation of the pattern of Fig. 7*a*;

Fig. 8 is a schematic sectional view of a twelve facet multiple mode delay line according to the present invention;

Fig. 9 is a schematic sectional view of a ten facet multiple mode delay line according to the present invention; and Fig. 10 illustrates the geometrical relationship between certain regular polygons and a nine facet multiple mode delay line according to the present invention.

Similar numerals refer to similar parts throughout the several views.

Figure 1:
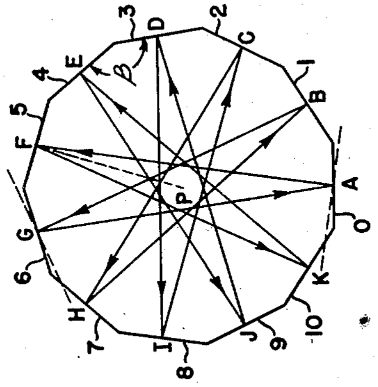
Fig. 1 is a schematic sectional view of a regular eleven-sided right prism constituting the basic shape of a radially symmetrical single mode delay line of the prior art.

In Fig. 1 is shown a regular polygon of $n$ sides representing in two dimensions a suitable ultrasonic propagation medium of the type employed in the construction of a radially symmetrical single mode delay line of the type described in the aforementioned copending application Serial No. 255,128, filed November 6, 1951. Since the polygon is regular, the angles between adjacent sides, represented by $\beta$, are all equal.

To facilitate comprehension letters such as A, B, C, etc., are used in Fig. 1 to show points of reflection and numbers are employed to designate the sides or facets of the polygonal crystal. For reasons hereinafter rendered obvious the numbering commences with 0 rather than 1.

Consider first the path of a sound ray traveling from the center of one side of the eleven-sided polygon of Fig. 1 to a side nearly diametrically opposite. By simple geometry the ray AF makes an angle of $\pi/2n$ radians or $360/4n$ degrees with respect to the normal PF from the center of the polygon and is reflected at the same angle along path FK. As the angle of incidence is always the same, the ray will strike successively the other facets in the order:

$$0 \searrow 5 \nearrow 10 \searrow 4 \nearrow 9 \searrow 3 \nearrow 8 \searrow 2 \nearrow 7 \searrow 1 \nearrow 6 \searrow 0$$

Having commenced numbering of the facets at zero and proceeded counterclockwise, the number of the facet at the first reflection point will be equal to the number of facets the path of energy will advance on each reflection in the negative modes, and the difference in position between the members of alternate pairs of reflection points will give the "order of the mode." The term "order of the mode" is used herein to designate the number of facets the path of energy will advance or retreat as a result of any pair of successive reflections. The order of the mode is further identified by the angle of incidence at which the beam or ray of ultrasonic energy strikes an untilted facet, each mode for a given polygon of $n$ sides having a different angle of incidence, individual angles of incidence being equal to $\pm m(\pi/2n)$, where $m$ is an integer within the limits $0 \leqq m \leqq n-2$ equal to the order of the mode for regular facets.

The above-noted representation of the path of the sound ray in terms of the facets successively reflecting the sound ray shows that alternate reflections fall into two series in which successive facets in each series are respectively one position behind the preceding member thereof on a circle inscribed in the regular polygon of Fig. 1. Therefore, this type of reflection has been called the −1 mode. If the path of the sound beam is directed to commence from the facet 0 to facet 6, rather than from facet 0 to facet 5, the resulting reflecting sequence is known as the +1 mode. The complete +1 mode is obtained by reading the sequence of the −1 mode set forth above from right to left. Note that the number base used in Fig. 1 is 11 rather than 10, and the difference 0→6 in the positive mode is still 5.

Figure 2:
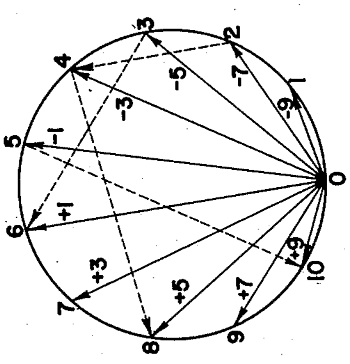
Fig. 2 is a diagrammatic representation of the possible modes of propagation from a single facet of a delay line according to Fig. 1.

Fig. 2 illustrates the first reflection for each of the 10 modes of an eleven facet line. Complete tabulation of the striking sequence for such an eleven facet line will therefore be as follows, wherein the striking sequences of the negative modes are read from left to right, and the striking sequences of the positive modes are read from right to left:

| Mode | Transmitter Facet | Reflecting Facets in Sequence | Receiving Facet | Mode |
|---|---|---|---|---|
| −1 | 0 | 5, 10, 4, 9, 3, 8, 2, 7, 1, 6 | 0 | +1 |
| −3 | 0 | 4, 8, 1, 5, 9, 2, 6, 10, 3, 7 | 0 | +3 |
| −5 | 0 | 3, 6, 9, 1, 4, 7, 10, 2, 5, 8 | 0 | +5 |
| −7 | 0 | 2, 4, 6, 8, 10, 1, 3, 5, 7, 9 | 0 | +7 |
| −9 | 0 | 1, 2, 3, 4, 5, 6, 7, 8, 9, 10 | 0 | +9 |

Since in adapting a radially symmetrical polygonal prism of this type for use as a delay line it is desired not to have the path closed, and since the optimum radiation and reception occur when the plane of the transducer is normal to the beam, it can be seen that the two facets on which the receiver and transmitter piezo-electric transducers are to be mounted must be tilted or rotated in opposite directions to each other. Thus the transmitter and receiver facets, e. g., facets 0 and 6 in Fig. 1, must be tilted by positive and negative amounts of $\pi/2n$ with respect to the regular facets. The dotted lines in Fig. 1 indicate how the facets 0 and 6 are oppositely tilted with respect to each other. The 0 and 6 facets are tilted so as to be normal to rays AF and BG, respectively.

If $\gamma$ is the angle of incidence measured from the normal to the facet, e. g., angle PFA in Fig. 1, the reflected beam will be at an angle of $\pi \pm 2\gamma$ with respect to the direction of the incident beam, where $\gamma = m(\pi/2n)$ and $m$ is an integer equal to the order of the mode for regular facets. For tilted facets, such as the receiver and transmitter facets, the reflected beam will be at an angle $\pi \pm 2(\gamma \pm \delta)$ where $\delta = L(\pi/2n)$ and L is another integer within the limits $0 \leqq L \leqq n-2$.

If L is 0, and $\delta$ therefore is 0, for all facets except the transmitter and receiver facets, only one cycle of $n-1$ reflections can occur before the beam strikes the receiver.

If $L \neq 0$ for at least one facet in addition to the transmitter and receiver facets, a shift in mode occurs that sends the beam into another cycle which will allow more than one reflection from the normal facets and increase the number of reflections before the receiver is struck for the first time. Since the different modes use the facets in different sequence, it is possible to combine the modes to produce more than one reflection, or none at all, at a given facet. Since the total path length is almost proportional to the number of reflections, an increase in delay time of at least 50% can be obtained over that obtained from a single mode. This principle of mode conversion is applied to and makes possible the present invention, which is described as a multiple mode delay line in contradistinction to the single mode delay lines of the above-noted copending applications.

A large number of combinations can be obtained by tilting any or most of the facets by various amounts. For the symmetrical types of patterns which are most useful, the tilted facets occur in pairs with the members of each having opposite signs of tilt, i. e., one tilted clockwise and the other counterclockwise.

Although the present invention extends to polygonal delay lines based on regular polygons having at least 5 sides, in practice delay lines based on regular polygons of at least 9 sides are preferred in order to achieve optimum use of the acoustic media.

Figure 3:
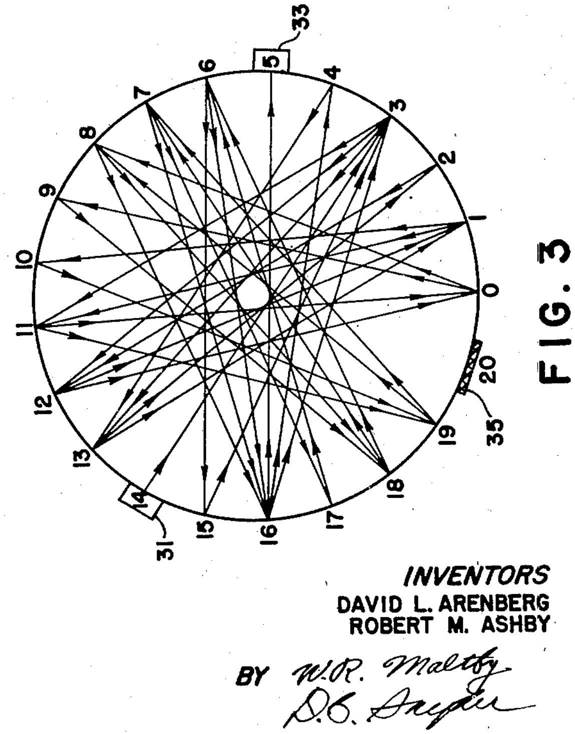
Fig. 3 is a schematic sectional view of a twenty-one facet multiple mode ultrasonic delay line according to the present invention.

While it is possible to tilt many pairs of facets, it is not always advantageous or necessary to tilt more than one pair of facets other than the receiver and transmitter facets. Fig. 3 schematically shows a preferred embodiment of the invention, the pattern being based on a polygon having 21 sides with a line of symmetry between the intersection of facets 9 and 10 and the mid-point of facet 20, about which the facets on both sides are mirror images.

A circular rather than a polygonal configuration is employed in Fig. 3 because of the difficulty involved in drawing a 21-sided polygonal prism and because such a circular configuration is as satisfactory in illustrating how delay lines of various sizes and different delay times may be produced in accordance with the present invention. A transmitting transducer 31 and a receiving transducer 33 are shown mounted on the delay line. Such a delay line, wherein facets 14 and 5 are the transmitter and receiver facets respectively and facets 0 and 19 are tilted by equal and opposite amounts, provides the following striking sequences:

| Mode | Number of Legs | Tilted Facet | Striking Sequence |
|---|---|---|---|
| −1 | 7 | 14−(xmtr) | 3, 13, 2, 12, 1, 11, 0− |
| −3 | 7 | 0− | 9, 18, 6, 15, 3, 12, 0− |
| −5 | 5 | 0− | 8, 16, 3, 11, 19+ |
| −3 | 7 | 19+ | 7, 16, 4, 13, 1, 10, 19+ |
| −1 | 7 | 19+<br>5+(rcvr) | 8, 18, 7, 17, 6, 16, 5+ |
| | Σ33 | | |

It should be noted that the tilt of the transmitter and receiver facet may be included in the third column of the above table since they are equal but of opposite sign. In order for the beam to strike the receiver facet in a direction normal thereto, it appears necessary that the algebraic sum of the angles through which the facets are tilted, counting for each time a facet is struck, equals 0. Thus in the above sequence, if facets 0 and 19 are both counted twice and facets 14 and 5 are counted once, the algebraic sum of the tilts equals 0.

Since facet 20 is not used in the above sequence, a stop of absorbing material 35 can be placed on it to aid in suppressing secondary signals. This absorbing material is secured to the edge of the disc in the region normally occupied by the facet.

For practical purposes, single mode delay lines of the type disclosed in the two applications set forth above, in order that an effective and satisfactory delay time may be obtained, are limited to designs having facets totaling either an odd number or an even number divisible by 4, as is rendered obvious by comparing some of the modes of reflection characteristic of an 11-, a 12-, and a 10-sided single mode polygonal delay line. In making this comparison, only the negative modes need be considered since the positive modes are just the reverse of the negative modes.

The normal striking sequences of the 0, −2, and −4 modes of reflection of a 10-sided polygonal delay line are as follows:

0 mode (A) 0–5
(B) 1–6
(C) 2–7
(D) 3–8
(E) 4–9

−2 mode (A) 0 ↘ 4 ↗ 8 ↘ 2 ↗ 6 ↘ 0
(B) 1 ↘ 5 ↗ 9 ↘ 3 ↗ 7 ↘ 1

−4 mode 0 ↘ 3 ↗ 6 ↘ 9 ↗ 2 ↘ 5 ↗ 8 ↘ 1 ↗ 4 ↘ 7 ↗ 0

The normal striking sequences of the 0, −2, −4, −6, −8, and −10 modes of a 12-sided polygonal delay line are as follows:

0 mode (A) 0–6
(B) 1–7
(C) 2–8
(D) 3–9
(E) 4–10
(F) 5–11
(G) 6–12

−2 mode (A) 0 ↘ 5 ↗ 10 ↘ 3 ↗ 8 ↘ 1 ↗ 6 ↘ 11 ↙ 4 ↘ 9 ↗ 2 ↘ 7 ↗ 0

−4 mode (A) 0 ↘ 4 ↗ 8 ↘ 0
(B) 1 ↘ 5 ↗ 9 ↘ 1
(C) 2 ↘ 6 ↗ 10 ↘ 2
(D) 3 ↘ 7 ↗ 11 ↘ 3

−6 mode (A) 0 ↘ 3 ↗ 6 ↘ 9 ↗ 0
(B) 1 ↗ 4 ↘ 7 ↗ 10 ↘ 1
(C) 2 ↘ 5 ↗ 8 ↘ 11 ↗ 2

−8 mode (A) 0 ↘ 2 ↗ 4 ↘ 6 ↗ 8 ↘ 10 ↗ 0
(B) 1 ↗ 3 ↘ 5 ↗ 7 ↘ 9 ↗ 11 ↘ 1

−10 mode (A) 0 ↘ 1 ↗ 2 ↘ 3 ↗ 4 ↘ 5 ↗ 6 ↘ 7 ↗ 8 ↘ 9 ↗ 10 ↘ 11 ↗ 0

The striking sequences of the −1, −3, −5, −7 and −9 modes of an eleven-sided delay line are set forth above in the description of Fig. 2.

It is clear that whereas the lowest (−1) mode of an eleven-facet single mode delay line provides a delay path of 10 legs, the lowest modes (0 mode) of a 12-sided and a 10-sided polygonal delay line provides delay paths each consisting of only 1 leg. The next lowest mode (−3) of an 11-facet delay line also has a delay path of 10 legs, but the next mode (−2) of the 12- and 10-sided delay lines have delay paths of 11 and 4 legs, respectively. It is apparent, therefore, that designs having an odd number of facets are to be preferred over designs having an even number. It is also clear that an even number of facets not divisible by 4 is not to be recommended when a single mode of reflection is contemplated since only a relatively short delay path is obtainable in the lower modes and because such single mode delay lines are no more effective than delay lines having exactly one-half the number of facets. For example, the −1 mode of a 5-facet delay line is comparable in path length and angles of incidence to the −2 mode of a 10-facet delay line. In both cases, the delay paths consist of 4 legs, excluding the leg back to the starting or 0 facet. The lower modes are to be preferred since, in addition to generally providing satisfactory delay times, the angle of incidence as measured from the ray to the normal to the facet varies directly with the mode, i. e., the lower the mode, the lower the angle of incidence. Consequently the effective aperture afforded by each facet is greater in the lower modes since the effective aperture of the facet is equal to the length of the facet multiplied by the cosine of the angle of incidence of the beam. The larger the effective aperture of the facet, the better the containment of the sound beam with less overlapping onto the facets adjacent the facet ordinarily intended as the reflection medium. Therefore, the effective aperture of the facets should be as large as possible to minimize beam spreading and the consequential production of secondary signals. An additional reason for preferring the lower modes of reflection is that individual legs are longer compared to the legs obtained in the higher modes. Furthermore, such lower modes permit more efficient use of the area of the delay line since the beam travels closer to the center of the line.

By application of the concept of mode conversion according to this invention, it is feasible to design polygonal delay lines having an even number of sides not divisible by 4 as well as those having an odd number of facets or an even number divisible by 4, and to extend the delay paths in polygonal delay lines to the point where even a 10-sided delay line will provide a satisfactory time delay, thereby overcoming the limitation of the single mode delay lines of the type described by copending applications Serial No. 255,178 and Serial No. 162,573.

Thus the 10-sided multiple mode delay line of Fig. 9 will provide a delay path consisting of 10 legs by utilizing only the first two modes (0, −2) of reflection. The composite striking sequence for this delay line will be:

| Mode | Path and direction of tilt |
|---|---|
| 0 | Trans. 0, 5− |
| −2 | 5−, 9+ |
| 0 | 9+, 4− |
| −2 | 4−, 8+ |
| 0 | 8+, 3− |
| −2 | 3−, 7+ |
| 0 | 7+, 2− |
| −2 | 2−, 6+ |
| 0 | 6+, 1 Rcvr |

Total number of legs=9.

This delay line may be regarded as having the transmitter and receiver facets in their normal position and all other facets tilted relative each other as indicated by the plus and minus signs. The magnitude of the angle of tilt is $\pi/2n$ or 9° for each tilted facet, and the algebraic sum of the angles of tilt is equal to zero.

Transducers are mounted on the transmitting and receiving facets of the delay line as shown in Figs. 8 and 9. Signals are introduced to the transmitting transducer by means of leads 21 and output signals are withdrawn from the receiving transducer by means of leads 22.

Fig. 8 illustrates a multiple mode polygonal delay line having 12 facets cut on its periphery. Transducers are mounted on the transmitting and receiving facets as shown, and lead wires 21 and 22 are employed to introduce and withdraw electrical signals. The −4, −6 and −8 modes, like the −2 mode of the 10-sided delay line illustrated in Fig. 9, each present several relatively short paths, any one of which may be utilized. Thus, in the delay line of Fig. 8, in which the striking sequence as tabulated below is obtained, the −4 mode, for example, is involved twice, but different facets are struck by the sound beam. The same is true of the −2 mode.

The direction of tilt of the facets and the striking sequence for this 12-sided multiple mode delay line, wherein facets 0, 2, 3, 6, and 9 are tilted through angles of +7½, −15°, +15°, −7½°, and +7½, respectively, are as follows:

| Mode | Path and direction of tilt |
|---|---|
| −2 | Trans. 2−, 7, 0+ |
| 0 | 0+, 6− |
| −2 | 6−, 11, 4, 9− |
| −4 | 9−, 1, 5, 9− |
| −6 | 9−, 0+ |
| −4 | 0+, 4, 8, 0+ |
| −2 | 0+, 5, 10, 3+ Rcvr |

Total number of legs=16.

The algebraic sum of the angles of tilt of facets 0, 2, 3, 6 and 9, counting once for each time a facet is struck, is equal to zero, thereby assuring that the direction of the beam is normal to receiver facet 3 for maximum excitation of the transducer secured to said facet 3.

Of course, delay lines may be designed which present a striking sequence beginning in modes higher than 0, −1, or −2. In all of these cases at least 4 facets are preferably tilted, although only 3 facets theoretically need be tilted to provide a multiple mode delay path. Preferably, as indicated hereinbefore above, the facets are tilted in pairs, the transmitter facet always being tilted if the receiver facet is tilted, and in a direction opposite to the direction of the angle of tilt of the receiver facet.

Figure 4:
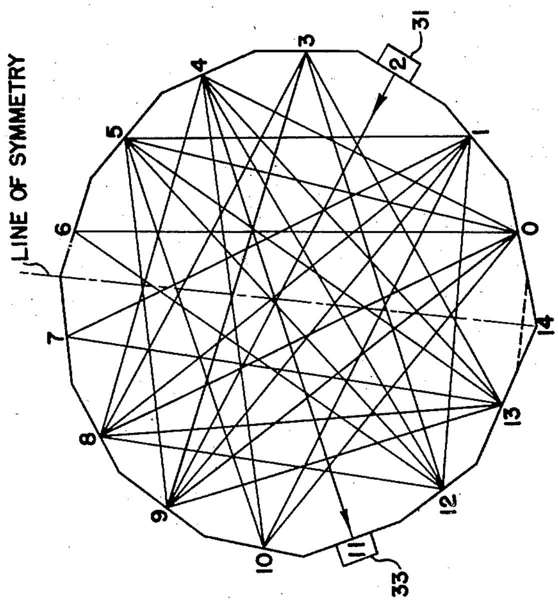
Fig. 4 is a schematic sectional view of a fifteen facet multiple mode ultrasonic delay line according to the present invention.

Fig. 4 shows a representative pattern based on a polygon of 15 sides, wherein facet 14, shown by dotted line, is not used, and preferably not cut, and its center coincides with the line of symmetry. Although facet 14 is not cut so that in fact the delay line has 14 instead of 15 facets, the angle between normal facets, i. e., untilted facets, is equal to the angle between the sides of a regular polygon of 15 sides, and the angle between adjacent tilted facets or a tilted facet and an adjacent facet differ from the angles between normal facets by increments of $\pi/2(R)$, where R is 15 and represents the number of sides of the regular polygon on which the delay line is based. Thus in the delay line of Fig. 4, the facets 2, 11, 0 and 13 are tilted by positive or negative multiples of 180/2(15)

rather than 180/2(14) degrees. The striking sequences in such construction will be as follows:

| Mode | Number of legs | Tilted Facet | Striking Sequence |
|---|---|---|---|
| −1 | 4 | 2− (xmtr) | 9, 1, 8, 0− |
| −3 | 5 | 0− | 6, 12, 3, 9, 0− |
| −5 | 3 | 0− | 5, 10, 0− |
| −7 | 7 | 0− | 4, 8, 12, 1, 5, 9, 13+ |
| −5 | 3 | 13+ | 3, 8, 13+ |
| −3 | 5 | 13+ | 4, 10, 1, 7, 13+ |
| −1 | 4 | 13+ | 5, 12, 4, 11+ |
| | | 11+ (rcvr) | |
| | Σ31 | | |

In summary, it can be seen that a delay line based upon a 15-sided polygon only needs to have 14 facets cut, and these give a delay time virtually equal to the delay time of a line having twice the number of sides, with one-half of the aperture. Also, if absorbing material is placed over the crystals on transmitter facet 2 and the receiver facet 11, as well as the uncut facet 14, then 3/15 or 20% of the area will not be reflecting and secondary signals will be suppressed markedly.

A further definitive characteristic of delay lines constructed according to the present invention is illustrated in Fig. 10. A nine-sided multiple mode delay line 50 symmetrical about a line extending from the midpoint of facet 4 to the intersection of facets 0 and 8 is shown drawn within a regular polygon 60 of 9 sides. Facets 0 and 1 are tilted in the minus direction and facets 7 and 8 in a positive direction.

Facets 1 and 7 are the transmitter and receiver facets, respectively. Transducers 51 and 52 are shown mounted on each of these facets. The modes of reflection and the path followed by a sound beam introduced at transmitter facet 1 are as follows:

| Mode | Path and Directivity of tilt | Number of legs |
|---|---|---|
| −1 | Trans. 1−, 5, 0− | 2 |
| −3 | 0−, 3, 6, 0− | 3 |
| −5 | 0−, 2, 4, 6, 8+ | 4 |
| −3 | 8+, 2, 5, 8+ | 3 |
| −1 | 8+, 3, 7+ Revr | 2 |

Total number of legs=14.

The normals to the untilted facets, 2, 3, 4, 5, and 6 are taken on the same radius as the normals to corresponding sides of the regular 9-sided polygon and the line is not adjusted for optimum aperture. However, all the angular relations are true. Unlike the 15- and 21-sided types already discussed, this delay line does not possess the characteristic of a missing or uncut facet.

Since the nine or $R=9$ sided polygon drawn outside of the delay line is regular, only 5 of its sides, 2, 3, 4, 5 and 6 are parallel to facets of the delay line. However, drawn outside of and concentric with the regular polygon is a regular polygon 70 of 36 sides ($4R=36$). The sides of the 36-sided regular polygon are consecutively numbered counterclockwise, the side proximate and parallel to the 0 side of the nine-sided regular polygon correspondingly being numbered 0. Visual comparison of the delay line and the 4R polygon reveals that each of the facets of the delay line, including the tilted facets, is parallel to a particular side of the 4R polygon. The sides numbered 35, 3, 8, 12, 16, 20, 24, 29, and 33 are respectively parallel to facets 0, 1, 2, 3, 4, 5, 6, 7 and 8 of the delay line. The normal facets of the delay line, i. e., untilted facets, are parallel to sides of the 4R polygon which are spaced from each other by multiples of 4. For example, untilted facet 6 is parallel to side 24 and untilted facet 4 is parallel to side 16, which sides 16 and 24 are spaced from each other by 8 sides or a multiple of 4 sides. On the other hand, tilted facet 7 is parallel to side 29, which is not spaced from either of sides 24 and 16 by a multiple of 4 sides.

Radially symmetrical delay lines of the type shown and described in copending applications Serial Nos. 255,128 and 162,573, mentioned hereinabove, may be distinguished from delay lines of the present invention by reason of the fact that in the former types only 2 of the facets are parallel to sides of a regular polygon of 4R sides which are not spaced by multiples of 4 from other sides of the 4L polygon which are parallel to the remaining facets of the delay line. Delay lines of the present invention have at least 3 facets, and preferably a minimum of 4 facets, parallel to sides of a 4R polygon which are not sequentially spaced from other parallel sides by a multiple of 4 sides.

Figure 6:
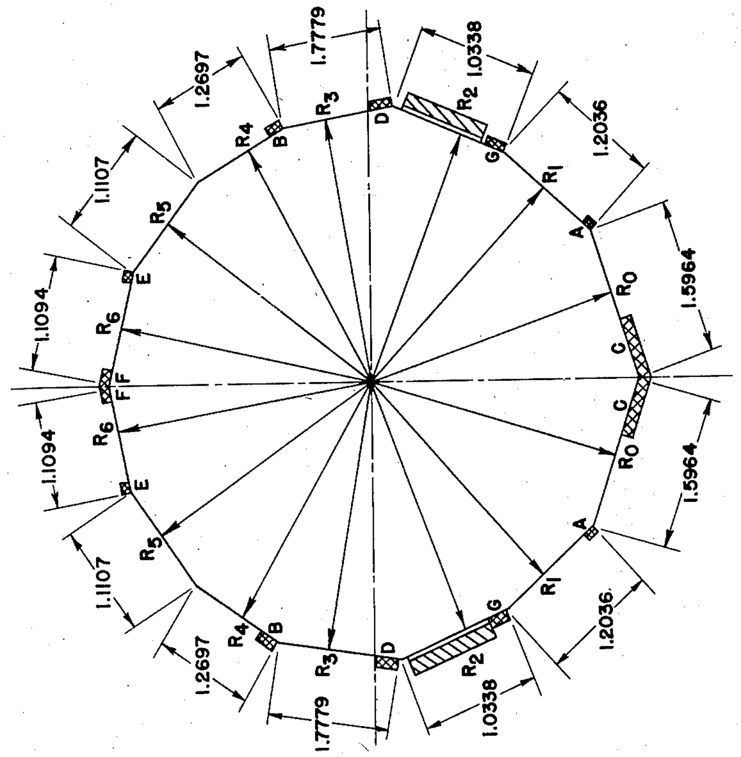
Fig. 6 is a schematic view of the same delay line showing the location and relative sizes of stops used to reduce the relative intensity of undesired signals.
Figure 5:
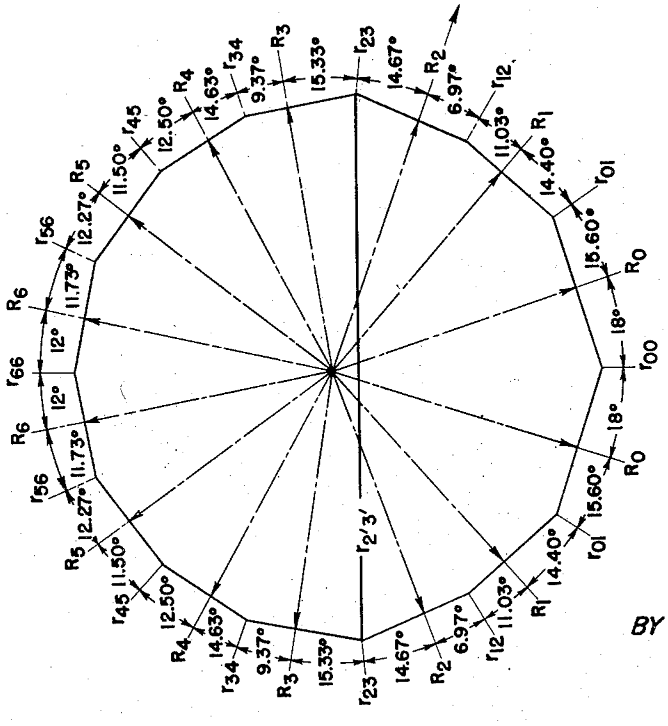
Fig. 5 is a diagrammatic representation of the multiple mode delay line of Fig. 4, showing coding system for designating distances of components.

While considerable increase in aperture size is accomplished as above indicated with all of the facets of equal size, a marked further increase in efficiency can be realized by providing appropriate differences in apertures sizes. Figs. 5, 6 and 7 are of assistance in illustrating the derivation of the proportioning of aperture sizes to achieve such results.

As stated above, the effective aperture of a facet is its length times the cosine of the angle of incidence. The ray pattern of Fig. 4 shows how some facets are struck at small angles of incidence, such as facets 6 and 7, while other facets are struck at relatively large angles, such as facets 5 and 12. Obviously, the latter facets will be of more restricting influence in determining the width of the beam, and it is advantageous to increase their size.

The method of "optimizing" the apertures follows along well-known principles used in optics by varying the relative distances of the normals from the individual facets to a fixed center. The optimizing procedure may be regarded as a second order approach in the design process in which the first order is based on considerations of the sound wave traveling as a plane wave with sharply defined geometrical limits confining it within the projected crystal areas. Due to the fact that all waves diffract or spread, some of the energy will travel over into adjacent areas and produce secondary signals. Hence the optimizing process consists of adjusting the relative effective apertures so that the sound beam will approach the edges of a facet without overlapping into adjacent facets. This is done for as many facets as possible to provide a strongly collimated beam.

Advantage is taken wherever possible at the start of simplifying conditions to facilitate the optimizing process. For example, the bilateral symmetry of Fig. 4 provides the premise that $R_0=R_{13}$, $R_1=R_{12}$, $R_2=R_{11}$, $R_3=R_{10}$, $R_4=R_9$, $R_5=R_8$, and $R_6=R_7$. Thus in Figs. 5 and 6, $R_0$ and $R_{13}$ are both labeled $R_0$, $R_1$ and $R_{12}$ are both labeled $R_1$, etc. To further simplify the optimizing process and for convenience in grinding, the "center" of the prism is arbitrarily taken along the line of symmetry between facets 6 and 7, and facets 0 and 13, at a point where $R_0=R_6$. Thus while a 15-sided polygon has, in general, 15 arbitrary constants, one has been lost because of the uncut facet 14, and because of the arbitrary relationship assumed between $R_0$ and $R_6$, the number of remaining arbitrary constants is reduced to 6.

Regardless of having thus simplified the starting conditions, it then becomes necessary to obtain a picture of the extended geometrical path of a sound beam. This is done by the usual procedure in optics of finding the image of an object in a mirror. Then the first image becomes the object for locating the second image about the second reflection line and so on. Figs. 7a and 7b illustrate this process for the geometrical path of the last half of the pattern in Fig. 4 as tabulated hereinbefore. The image of the entire delay line about the reflection point is always shown. The position of receiver facet 11 is indicated at all reflections. Images about other facets are possible though less strong. These secondary and higher order images are not shown but would occur at appropriate places above and below the primary images wherever the extended path of the sound beam crosses the receiver crystal. The position of receiver facet 11 indicates the possibility of secondary signals being received when it is near the beam. Thus if the limits of the geometrical beam are beyond the effective aperture at any reflecting facet, the energy in the outer region will be cut off and may be reflected from the adjacent facets into unwanted paths to produce secondary signals out of phase with the primary signal. Hence the optimizing process consists of adjusting the relative effective apertures so that the sound beam will come as close to the edges, but not beyond, as many reflecting facets as possible.

The procedure followed was to set up the analytical expressions for the X and Y coordinates of an arbitrary center of the prism in terms of the lengths of the normals from the center to the facets, and the angles between adjacent facets. In addition to the first set, two more sets of equations were set up denoting the distance above and below the center of the edges of the reflecting facet.

Although 31 reflections occur, the symmetry of the path reduces the number of reflections to be considered to 15 plus one more for the terminus at the crystal. Also, although 14 facets occur, the symmetry of the prism reduces the number of different normals $R_i$ to consider to seven, and the arbitrary choice of a center such as having $R_0=R_6$ allows a further reduction to but six independent variables.

The two sets of expressions for the top and bottom limits of the aperture can finally be arranged in the form:

A. For the top limits:

$$Y_0^{top}=A_{0,0}R_0+A_{0,1}R_1+A_{0,2}R_2+\ \ldots\ A_{0,5}R_5$$
$$Y_1^{top}=A_{1,0}R_0+A_{1,1}R_1+A_{1,2}R_2+\ \ldots\ A_{1,5}R_5$$

- - - - - - - - - - - - - - - - - - - - - - - - - - - - - - - - - - - - - - - - - - - -

$$Y_{15}^{top}=A_{15,0}R_0+A_{15,1}R_1+A_{15,2}R_2+\ \ldots\ A_{15,5}R_5$$

B. For the bottom limits:

$$Y_0^{bottom}=B_{0,0}R_0+B_{0,1}R_1+B_{0,2}R_2+\ \ldots\ B_{0,5}R_5$$
$$Y_1^{bottom}=B_{1,0}R_0+B_{1,1}R_1+B_{1,2}R_2+\ \ldots\ B_{1,5}R_5$$

- - - - - - - - - - - - - - - - - - - - - - - - - - - - - - - - - - - - - - - - - - - -

$$Y_{15}^{bottom}=B_{15,0}R_0+B_{15,1}R_1+B_{15,2}R_2+\ \ldots\ B_{15,5}R_5$$

In these expressions the coefficients $A_{ij}$ and $B_{ij}$ involve only trigonometric functions of the angles between adjacent facets and the angles of incidence of the sound ray in the different modes. These are reduced to their purely numerical values, since they are always fixed in a given pattern. The terms $R_k$ ($k$=0, 1, 2, 3, 4, 5) give the relative values of the normals which can be adjusted arbitrarily to optimize the aperture.

The basic assumption that the best performance is obtained when the geometric beam just grazes the edge of the facet at each reflection would require that all $Y_i^{top}$ be equal, and also all $Y_i^{bottom}$. Because there are 32 equations and only 6 variables, a solution by the usual techniques for solving simultaneous linear equations is not possible.

The best approach to maximizing the apertures is to introduce arbitrary values for the $R_i$'s, and calculate the respective top and bottom limits. Inspection of the results will reveal at which reflections the geometrical beam is most strongly limited. A new set of values for $R_i$ is then chosen so that the smaller values will increase. The calculations for the top and bottom limits are repeated until as many of the lower limits of the top and bottom $Y_i$'s were equal, and the difference between $Y^{top}$ minimum and $Y^{bottom}$ maximum is as great as possible. The changes $\Delta R_r$, where $\Delta R_r$ is equal to increments of $R_k$, become progressively smaller, and the trial and error process will eventually reach a limit.

The relative and specific lengths of the radii that were obtained in this manner for the 15 facet line of Fig. 5, whereby the sound beam is limited equally at 14 different points at the intersection of the facets, are the following:

| | Relative Length to Coordinate Axis | Length in Inches to Coordinate Axis for 1,040μ sec. Delay in a Fused Quartz Delay Line |
|---|---|---|
| $R_0$ | 1.00000 | 2.64527 |
| $R_1$ | 1.00547 | 2.6598 |
| $R_2$ | 1.01685 | 2.6898 |
| $R_3$ | 1.01371 | 2.6816 |
| $R_4$ | .99417 | 2.6298 |
| $R_5$ | .99796 | 2.6398 |
| $R_6$ | 1.00000 | 2.64527 |
| $R_{00}$ | 1.0514 | 2.7812 |
| $R_{01}$ | 1.0382 | 2.7463 |
| $R_{12}$ | 1.0244 | 2.7098 |
| $R_{23}$ | 1.0511 | 2.7804 |
| $R_{34}$ | 1.0274 | 2.7178 |
| $R_{45}$ | 1.0183 | 2.6937 |
| $R_{56}$ | 1.0213 | 2.7016 |
| $R_{66}$ | 1.0223 | 2.7043 |
| $R_{23}$ | 1.0414 | 2.754 |

In grinding the delay line, the material is held in a jig and rotated about a fixed center or axis, which provides a convenient origin or coordinates. Figs. 5 and 6 show the relative angles and distances of the final pattern based on a 15-sided polygon (the numbers used to designate distances being relative).

In most cases, only one boundary of a facet is the beam geometrical limit, and a portion of the area near the other boundary is not utilized at any reflection. This free area can be a "stop" area where sound absorbing material such as silver paint can be placed to reduce unwanted reflections and collimate the beam, as indicated in Fig. 6 and in the following table:

| Stop | On Facet | Nearest Facet | Length Relative To $R_0$ | Rad. | Length in Inches |
|---|---|---|---|---|---|
| A | 1 | 0 | 0.03449 | $R_0$ | 2.64527 |
| B | 4 | 3 | 0.05995 | $R_1$ | 2.6598 |
| C | 0 | 0 | 0.21797 | $R_2$ | 2.6898 |
| D | 3 | 2 | 0.08457 | $R_3$ | 2.6816 |
| E | 6 | 5 | 0.03220 | $R_4$ | 2.6298 |
| F | 6 | 6 | 0.05966 | $R_5$ | 2.6398 |
| G | 2 | 1 | 0.07833 | $R_6$ | 2.64527 |

Direct calculation shows that such maximizing increases the relative aperture for a 1040μ sec. delay line with a total path length of 153.308" in fused quartz from .72936" to .8460".

It has been found in practice that due to diffraction effects which still exist, the sound beam is not entirely confined to the geometrical path defined by the stops. The diffracted energy will produce a set of secondary signals. Because of the complexity of diffraction problems the exact dimensions of the stops indicated in Fig. 6 are best found empirically. Depending on the frequency used and the quality of the quartz, enlarging the stops approximately .04" at each side over the dimensions given above provided still further improvement in reducing secondary signals.

By use of a high quality quartz disc having carefully ground top and bottom surfaces and a relatively high carrier frequency, it is possible to make the delay line relatively thin for example ¼" for a 1,000 microsecond delay line. In such a thin delay line the reflections between the top and bottom surfaces causes the energy to act as if it were in an infinite medium perpendicular to the plane of the plate. However, poorer grades of quartz or irregularities in the top and bottom surfaces may produce interference effects and deterioration of the band pass curve of the delay line. Stops or absorbing material placed on the top and bottom surfaces will eliminate the interference effects with only a small decrease in amplitude of the transmitted signal.

Figs. 1, 8 and 9 illustrate how the facet may be tilted about its center or about one of its ends, the dotted lines indicating the position of the facet before tilting. From a machining standpoint, the facets are preferably tilted as illustrated in Fig. 9 since no internal angles need be cut and less waste results.

The multiple mode delay line is best adapted to solid acoustic media such as fused quartz, isotropic glasses, polycrystalline metals and, in certain cases, single crystals. For solids, piezoelectric transducers generating a pure transverse vibration, oriented with the direction of motion of the particle perpendicular to the plane of incidence at the reflectors, have proved to be best. Multiple mode delay lines can be used with liquid media also, provided the reflectors are solids with a critical angle for total reflection that is less than the angle of incidence in the lowest mode. Because the latter angle, $\pi/2n$, increases as $n$ decreases, multiple mode types are preferable to simple radially symmetrical types. The transducers employed should, of course, generate a purely longitudinal wave in liquids.

It is evident from the foregoing description and analysis of construction that the multiple mode delay lines described afford new and unobvious advantageous results. Larger apertures at the reflectors, with smaller amounts of diffracted energy being dissipated or producing secondary beams, are provided. A larger proportion of reflecting area is made available for stops. As compared with single mode delay lines, fewer facets must be cut for a given delay time, and even delay lines having an even number of sides not divisible by 4 are practicable. A substantial saving in space and material for a given delay time is assured. The larger angles of incidence improve markedly the performance of liquid designs. Finally, the larger apertures provided make it more feasible to refocus the beam with curved reflectors.

Obviously many modifications and variations of the present invention are possible in the light of the above teachings. For example, a different total number of facets and a different combination of tilted facets may be cut, and the transmitting and receiving facets need not be normal to the top and bottom surfaces of the disc whereby the beam is caused to be reflected from the top and bottom surfaces as well as from the facets, as described in the copending applications cited above.

It is therefore to be understood that within the scope of the appended claims the invention may be practiced otherwise than as specifically described.

The invention described herein may be manufactured and used by or for the Goverment of the United States of America for governmental purposes without the payment of any royalties thereon or therefor.

What is claimed is:

1. An ultrasonic delay line having $n$ lateral facets arranged in the shape of a non-regular polygon of $n$ sides, a predetermined number of said $n$ facets comprising respective sides of a regular polygon of R sides, R being an integer $\geqq n$, the others of said $n$ facets, at least three in number, being parallel respectively to sides of a regular polygon of 4R sides concentric with said regular polygon of R sides and non-parallel with sides of said regular polygon of R sides, whereby an ultrasonic beam entrant at one facet of said delay line and emergent at a facet thereof is caused to traverse a series of transits within the delay line defining multiple modes of internal reflection.

2. An ultrasonic solid delay line comprising $n$ lateral facets forming a non-regular polygon, a predetermined number of said facets comprising respective sides of a regular polygon of R sides, R being $\geqq n$, and being parallel to sides of a regular polygon of 4R sides concentric with said regular polygon of R sides, the remainder of said $n$ facets, at least three in number, being parallel respectively to sides of said regular polygon of 4R sides concentric with said regular polygon of R sides and non-parallel with sides of said regular polygon of R sides, whereby an ultrasonic beam entrant at one facet of said delay line and emergent at a facet thereof is caused to traverse a series of transits within the delay line defining multiple modes of internal reflection.

3. An ultrasonic solid delay line having $n$ facets perimetrically arranged between two end surfaces, $n$ being greater than 4, the angular relationship of said facets being such that a predetermined number of said facets substantially comprise respective sides of a regular polygon of R sides, R being an integer equal to or greater than $n$, the rest of said $n$ facets, at least three in number, each being angularly disposed relative to corresponding sides of said regular polygon of R sides, all of said $n$ facets being substantially parallel to sides of a regular polygon of 4R sides disposed concentric with said regular polygon of R sides and having R sides parallel to the sides of said regular polygon of R sides.

4. A delay device having the shape of a substantially regular polygon of fifteen sides numbered 0 to 14 in a counterclockwise direction, the line of symmetry of which device passes through the intersection of sides 6 and 7 and the midpoint of side 14, a first transducer mounted on side 2, and a second transducer mounted on side 11, said first and second transducer sides being rotated from their regular positions equally in opposite directions, and sides 0 and 13 being similarly rotated, whereby energy entering the delay device from said first transducer side will be reflected at least thirty times before being detected at said receiving side.

5. A delay device of the type described in claim 4 wherein absorbing material is placed on side 14 to thereby suppress secondary signals.

6. A delay device having the shape of a substantially regular polygon of twenty-one sides numbered 0 to 20 in a counterclockwise direction the line of symmetry of which device passes through the intersection of sides 9 and 10 and the midpoint of side 20, a first transducer mounted on side 14, and a second transducer mounted on side 5, said first and second transducer sides being rotated from their regular positions equally in opposite directions, and sides 0 and 19 being similarly rotated, whereby energy entering the delay device from said first transducer side will be reflected at least thirty-two times before being detected at said receiving side.

7. A delay device of the type described in claim 6 wherein absorbing material is placed on side 20 to thereby suppress secondary signals.

8. A solid delay device having $n$ peripheral facets arranged in the form of a modified regular polygon between a pair of parallel boundary surfaces, a transmitting transducer located on a first facet and adapted when energized to introduce a sonic beam into said solid delay device, a receiving transducer located on a second facet, each of said facets being rotated from normal positions in a regular $n$ sided polygon in opposite directions about axes parallel to the line formed by the intersection of the plane of the facet and an adjacent facet by a first amount, a third and a fourth facet of said delay device being rotated from normal positions in a regular $n$-sided polygon in opposite directions about axes parallel to the line formed by the intersection of the planes of each of said third and fourth facets and an adjacent facet by a second amount whereby the summation of the products obtained by multiplying the angular rotation of each rotated facet as measured from its corresponding position in a regular $n$-sided polygon, opposite signs being given to different directions of angular rotation, by the number of times each of these facets is struck by the sonic beam propagated within said delay device is equal to zero.

9. A solid delay device having $n$ peripheral planar facets arranged perpendicular to a pair of planar boundary surfaces to form a modified regular polygon in which at least three of said facets are displaced from their normal positions in an $n$-sided regular polygon and the remainder occupy their normal positions in an $n$-sided regular polygon, a transmitting transducer located on a first displaced facet and adapted when energized to introduce a sonic beam into said solid delay device, said first displaced facet being oriented in a direction such that the path of reflection of said beam from a first plurality of normally placed facets forms a first pattern, a second displaced facet in said path of reflection oriented to reflect said beam in a direction such that its path of reflection from a second plurality of normally placed facets forms a second pattern different from said first pattern, said first plurality of normally placed facets and said second plurality of normally placed facets including at least one common facet, and a receiving transducer mounted on a third displaced facet, said third displaced facet being oriented to receive said sonic beam approximately perpendicular to its face.

References Cited in the file of this patent

UNITED STATES PATENTS

| | | |
|---|---|---|
| 2,263,902 | Percival | Nov. 25, 1941 |
| 2,540,720 | Forbes | Feb. 6, 1951 |
| 2,624,804 | Arenberg | Jan. 6, 1953 |